Sept. 27, 1966     E. M. KEEN ETAL     3,274,972
EGG LAYING BATTERIES
Filed April 15, 1965     7 Sheets-Sheet 1
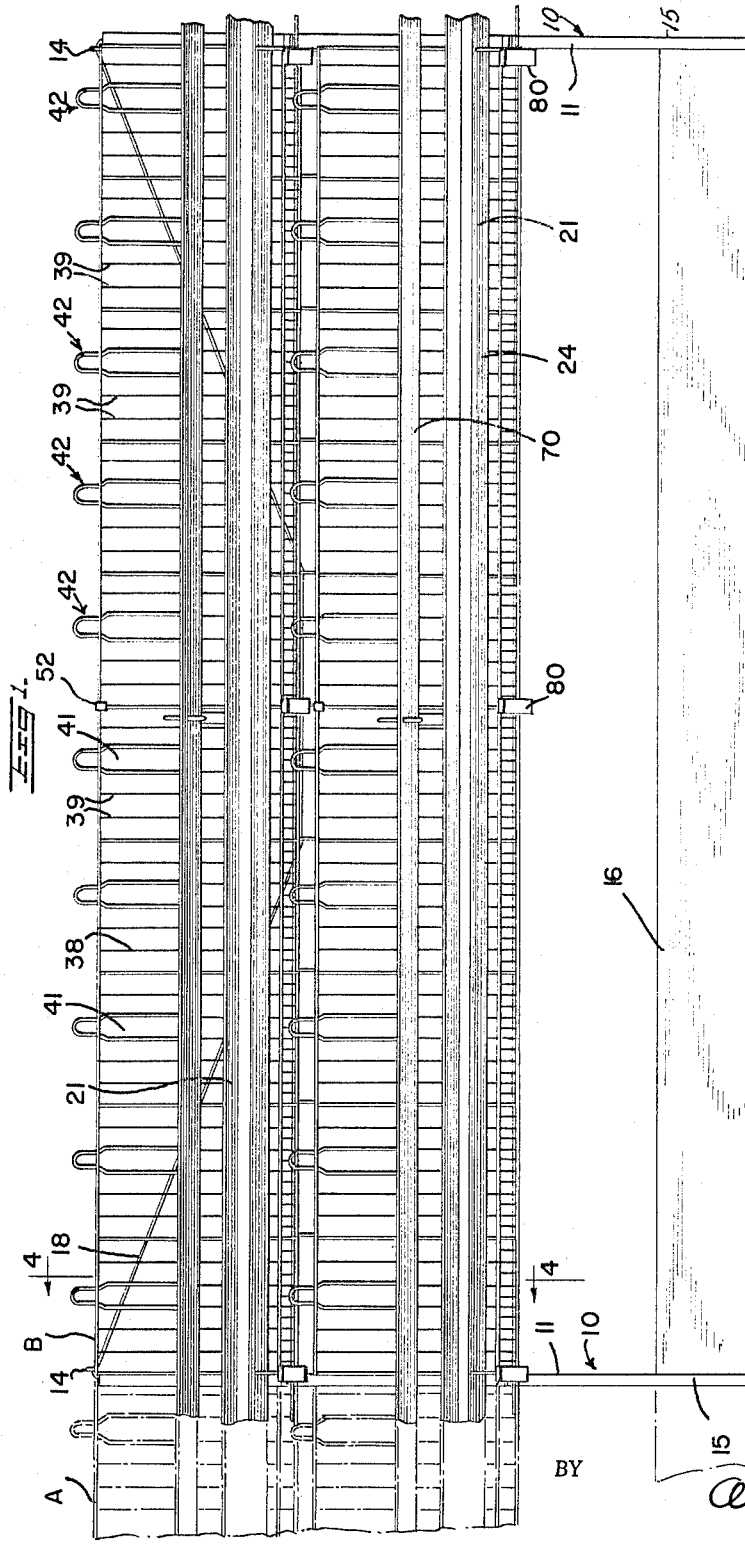
INVENTORS
EVERETT M. KEEN
ANTHONY J. SICILIANO
BY
ATTORNEY

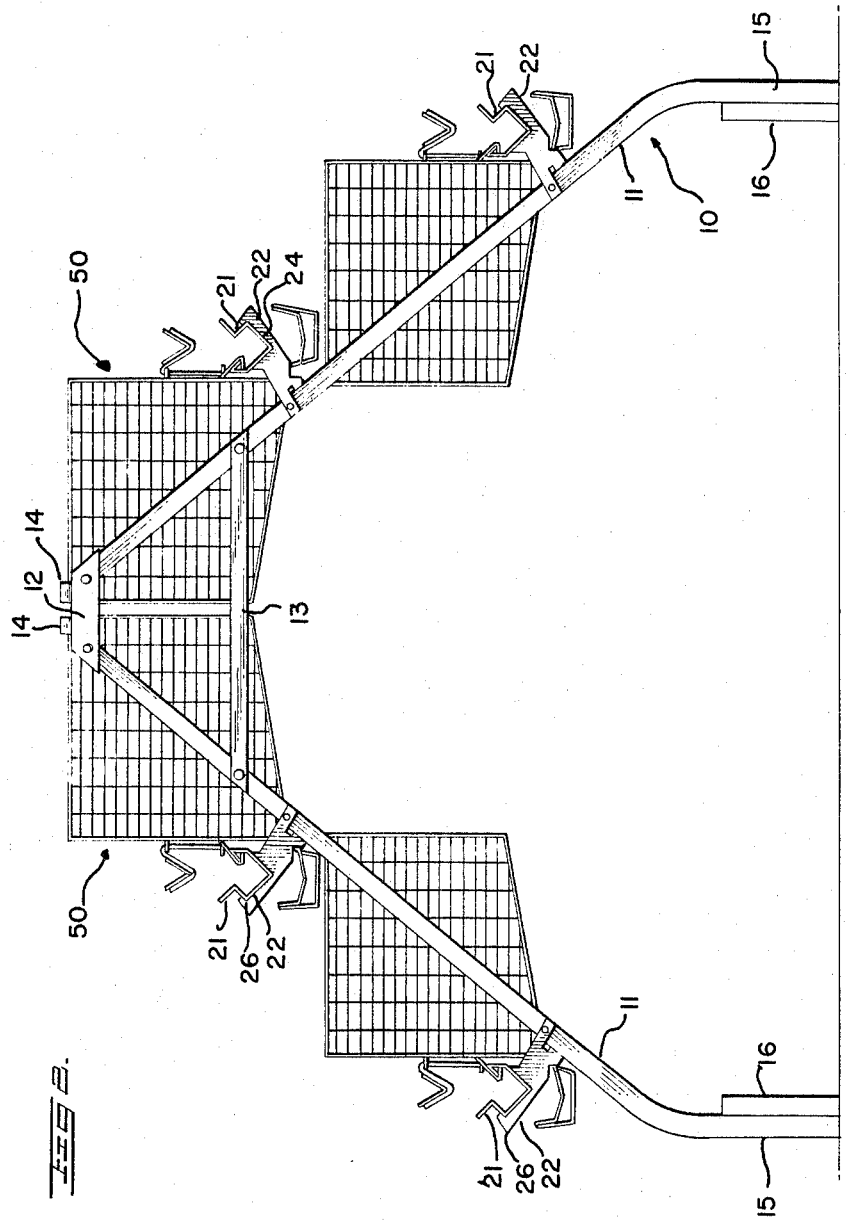

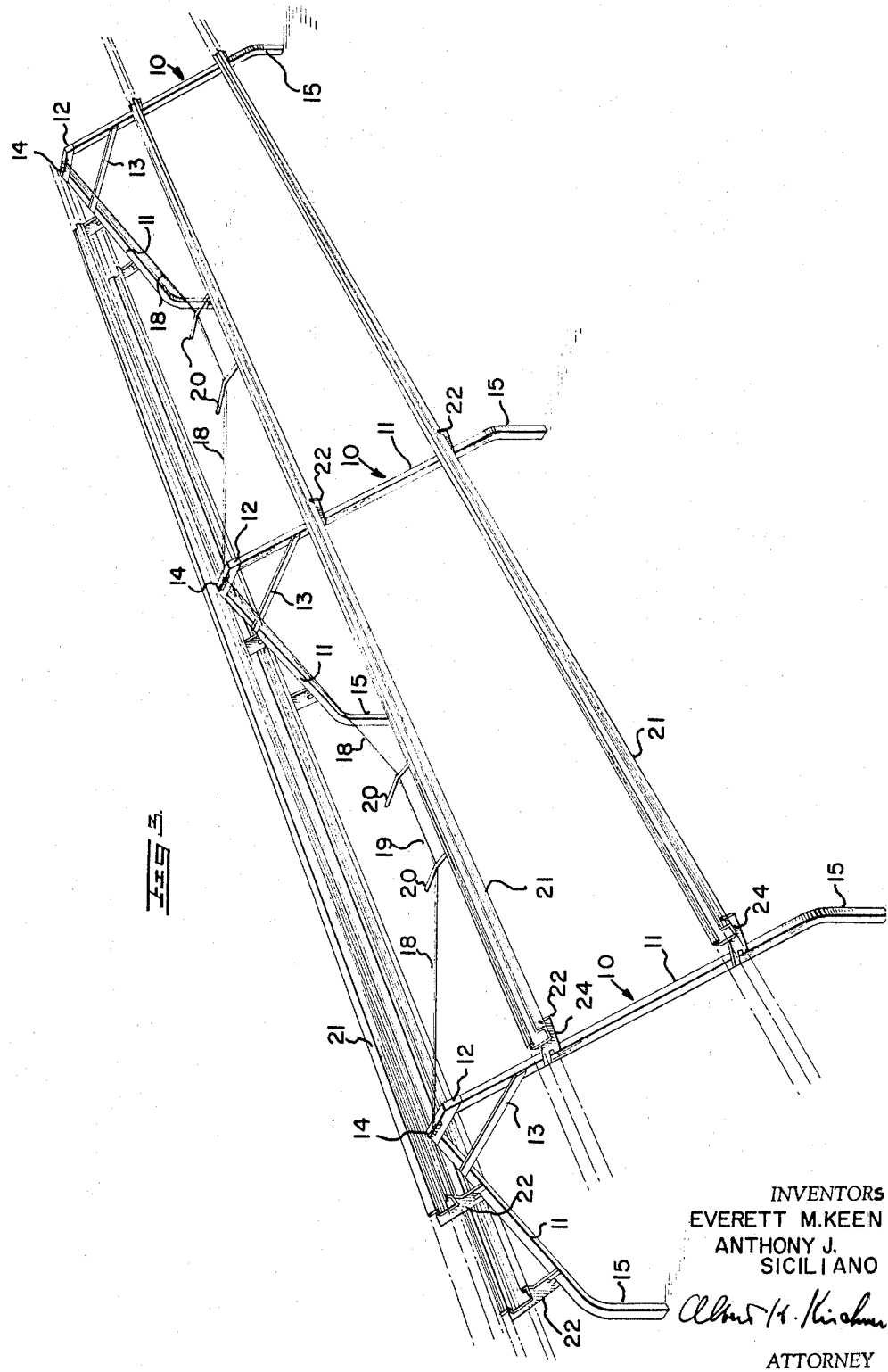

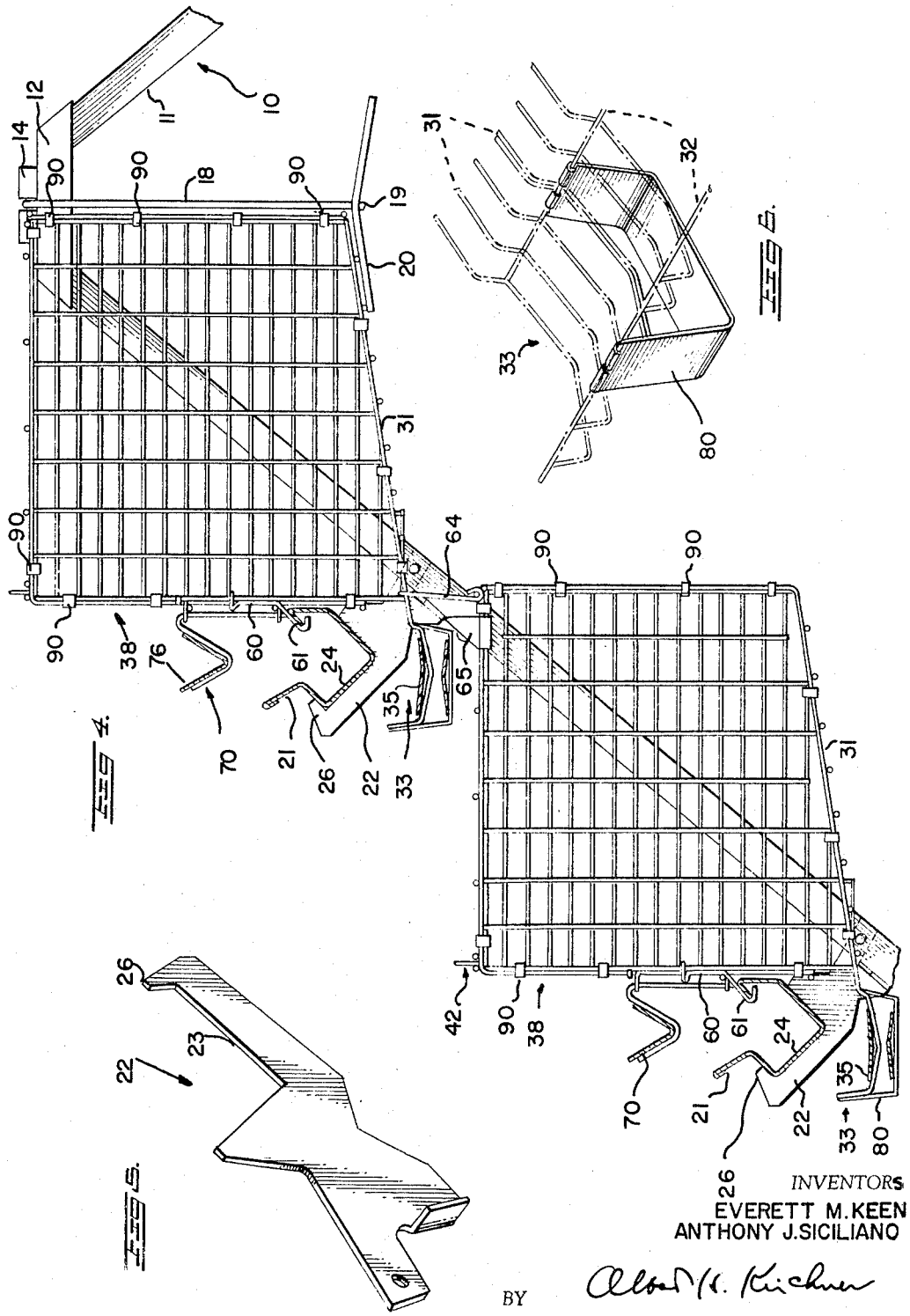

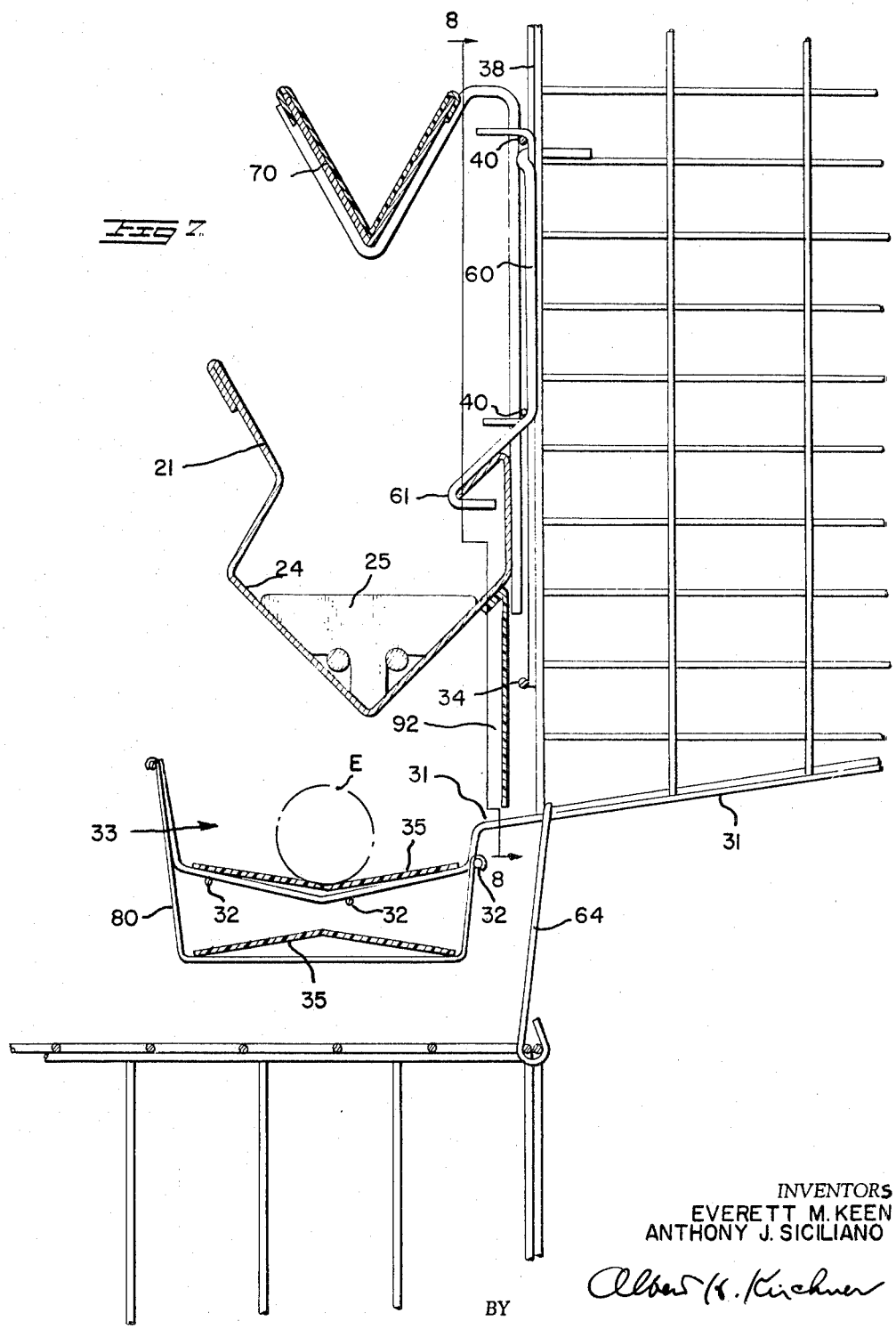

Sept. 27, 1966    E. M. KEEN ETAL    3,274,972
EGG LAYING BATTERIES
Filed April 15, 1965    7 Sheets-Sheet 6
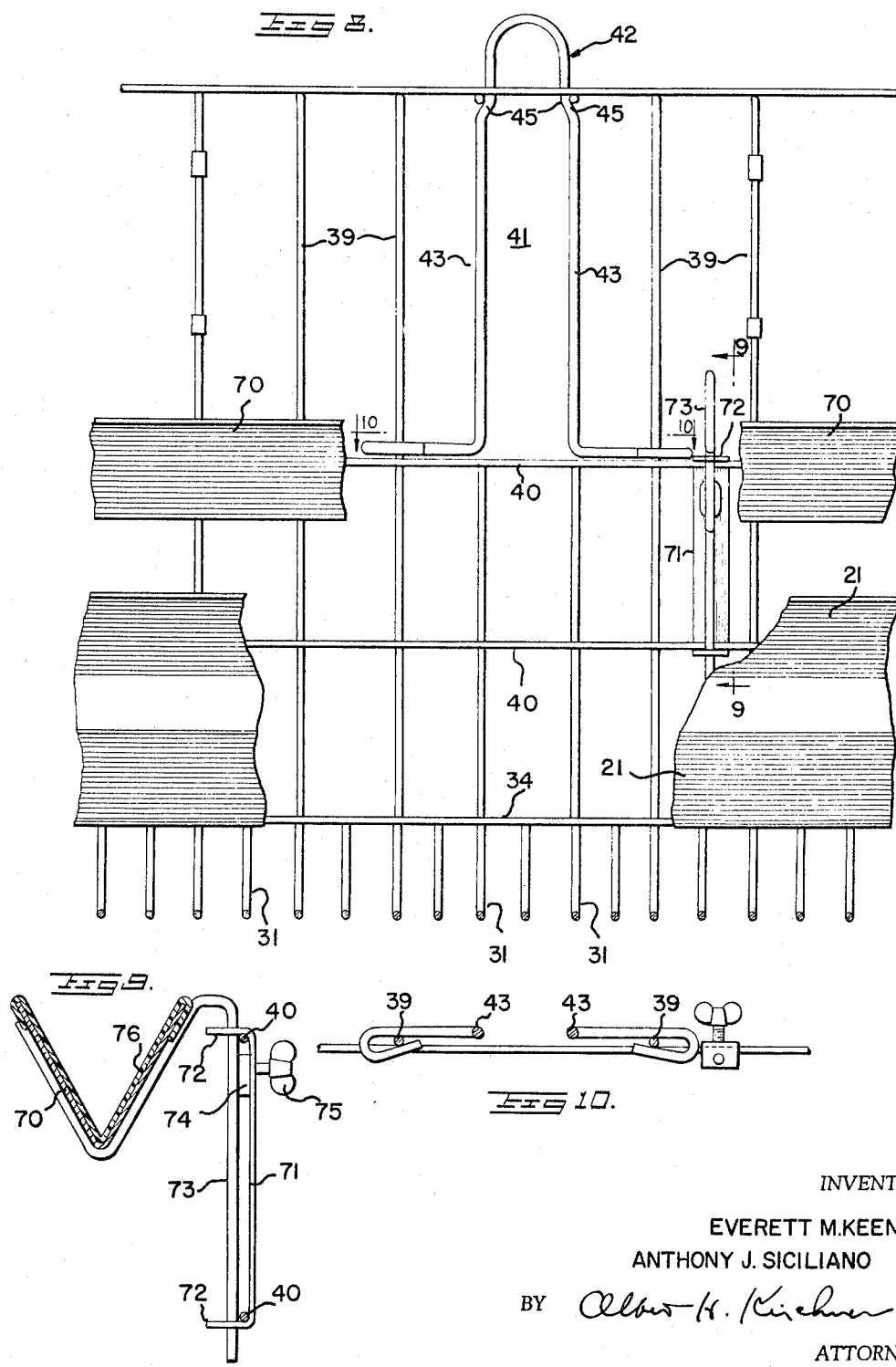
INVENTORS
EVERETT M. KEEN
ANTHONY J. SICILIANO
BY Albert H. Kirchner
ATTORNEY Sept. 27, 1966  E. M. KEEN ETAL  3,274,972
EGG LAYING BATTERIES
Filed April 15, 1965  7 Sheets-Sheet 7
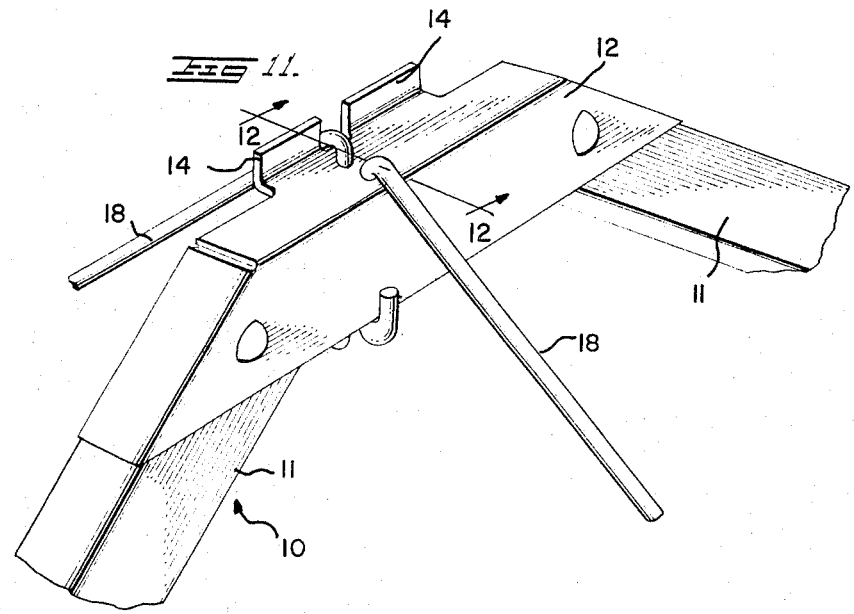
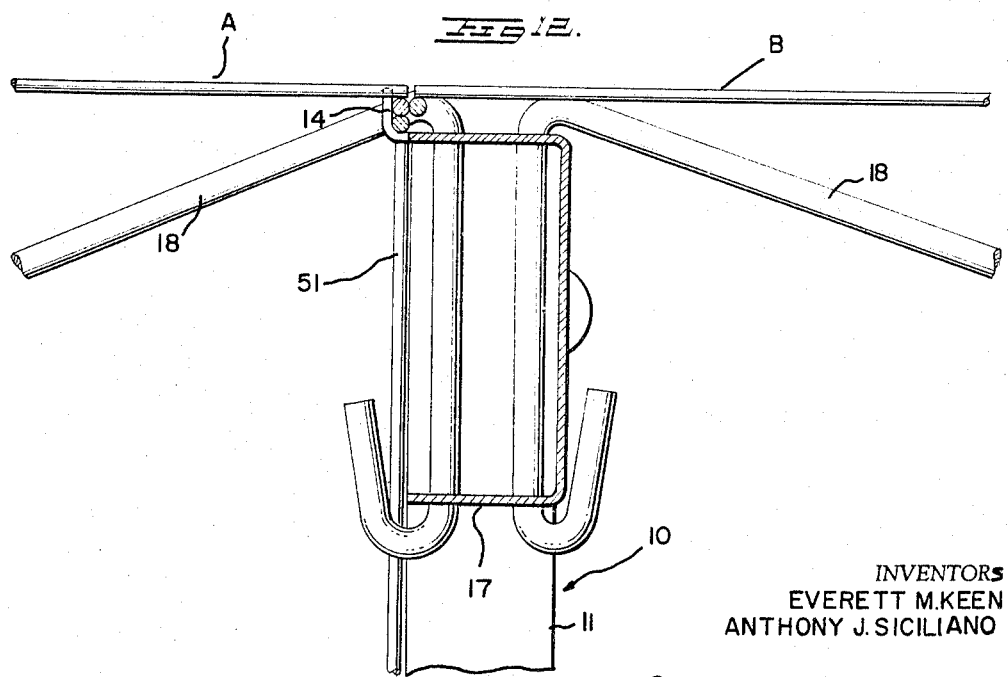
INVENTORS
EVERETT M. KEEN
ANTHONY J. SICILIANO
BY *Albert H. Kirchner*
ATTORNEY

United States Patent Office 3,274,972
Patented Sept. 27, 1966

3,274,972
EGG LAYING BATTERIES
Everett M. Keen and Anthony J. Siciliano, Millville, N.J., assignors to Keen Manufacturing Corporation, Millville, N.J., a corporation of New Jersey
Filed Apr. 15, 1965, Ser. No. 448,300
14 Claims. (Cl. 119—48)

The present invention relates to laying batteries for the poultry industry and more particularly provides a multiple cage construction and various adjunct devices, including feed and water supplying troughs and egg collecting means, all adapted to be readily assembled and securely mounted on an easily erected rigid supporting framework.

An important object of the invention is to provide an egg-laying cage construction, preferably embodying a plurality of cage units each having a wire mesh floor for passing droppings from the hens, mounted at a downwardly and forwardly sloping angle for delivering newly laid eggs promptly and safely from the cage to a conveyor which carries them to a collecting point.

A further object is to provide such a construction of the type indicated in which the eggs are caused to roll from the cage onto a special cushion strip conveyor on which they will immediately assume non-rolling longitudinal alignment for safe forwarding to the collecting point.

A further object is to provide such a cage the sloping bottom of which is formed of wire mesh having spaced apart longitudinal and cross wires arranged in a mesh that will provide good footing for the hens, will pass the droppings and require a minimum of cleaning effort, and at the same time will cause newly laid eggs to roll immediately out of the cage onto the egg collecting conveyor, with no danger of any egg being retained on the floor for possible damage by the hens.

A further object is to provide a construction wherein a frame structure comprising inverted V-shaped framing members supports two upper cage assemblies set back to back and facing in opposite directions and a lower cage assembly is supported by each leg of the framing members, the eggs from the cages being discharged outwardly from the frame structure to be collected and moved by the associated conveyors.

A further object is to provide novel means for supporting the cages relative to the framing structure.

Another object is to provide each cage with a watering trough, and with a feed trough having a conveyor associated therewith to supply adequate quantities of feed to each cage, and to provide novel means for supporting the watering and feed troughs of the associated cages relative to each other.

A further object is to provide each cage with a novel type of normally latched gate which is adapted to be readily opened for placing hens in and removing them from each cage.

Another object is to provide an egg laying cage installation comprising a series of inverted V-shaped framing members adapted to be disposed equidistantly in longitudinally spaced parallelism and fixed into a rigid framework of any predetermined length by longitudinal trough members from which any number of cage assemblies can be hung in longitudinal alignment at the same horizontal level with the adjacent ends of contiguous assemblies clamped to an intervening leg of a framing member and contributing materially to the rigidity of the erected structure, thereby producing an installation of whatever length may be desired, with a single egg-collecting conveyor and a single feed trough and a single watering trough serving the entire tier of cages.

A related object is to provide a framework of the type indicated with a plurality of tiers of such cage assemblies, vertically offset in stepped relation for clearance of droppings and ease of servicing, each tier being provided with its own egg-collecting trough and feeding and watering troughs.

Other objects and advantages of the invention will be apparent from the following description.

In the accompanying drawings, which illustrate the invention in certain preferred forms of embodiment:

FIGURE 1 is a front elevational view of a complete assembly erected in operative position;

FIG. 2 is an end elevational view of the same;

FIG. 3 is a perspective view of the erected frame structure including the connecting and rigidifying troughs, prior to attachment of the cage assemblies and their associated parts;

FIG. 4 is a relatively enlarged vertical transverse sectional view taken on the line 4—4 of FIG. 1;

FIG. 5 is a perspective view of one of the brackets for supporting the feed conveying trough;

FIG. 6 is a perspective view of one of the bearings that supports the return run of the egg conveying belt;

FIG. 7 is a still further relatively enlarged vertical transverse sectional view taken through the three superposed troughs of one tier of cages, showing in side elevation portions of the two adjacent relatively superposed tiers;

FIG. 8 is a view of the same parts, shown in front elevation, on the section line 8—8 of FIG. 7;

FIG. 9 is a detail vertical sectional view taken on the line 9—9 of FIG. 8;

FIG. 10 is a detail horizontal sectional view taken on the line 10—10 of FIG. 8;

FIG. 11 is a fragmentary perspective view of the upper portion of one of the framing members; and FIG. 12 is a longitudinal vertical sectional view taken transversely through the framing member of FIG. 11 on the line 12—12 of FIG. 11.

In these figures, the reference numeral 10 designates generally each one of a plurality of identical framing units each of which comprises a pair of downwardly and outwardly sloping leg members 11 connected at their top ends by a cap piece 12 and a little further down by a tying brace 13. The leg members are formed from stout rigid iron or steel stock such as the box shapes shown, or they may be made of channel or angle irons. The brace 13 may be of strap iron, and the cap piece 12 is a specially formed heavy sheet metal stamping fitted over the tops and upper front portions of the leg members, and being riveted thereto, as is also the brace 13, all as shown in FIGS. 2, 11 and 12. As there seen, the cap piece is provided at one edge with a pair of upstanding ears 14 spaced apart to provide a central notch, and the cap piece has a pair of holes drilled in its top plate portion for a purpose hereinafter to be explained.

Each framing unit 10 is thus a rigid element, constituting a sort of A-frame, the essential portion of which is the pair of downwardly and outwardly sloping legs or leg members 11. The lower ends of these legs may be straightened into short vertical feet as shown at 15, and when erected in equidistantly longitudinally spaced parallelism to form the basic framework shown in FIG. 3, a heavy wooden plank, of for example two by twelve inch lumber, as shown at 16 in FIG. 2, may be bolted to the inner surfaces of these feet.

The cap piece 12 has its lower marginal portion 17 inturned at a right angle to span the short distance between the two legs 10, as shown in FIG. 12, and two holes are formed in this portion, in vertical alignment with the holes in the top of the cap piece.

A heavy wire 18, amounting substantially to a stout rod, has its ends secured through the registering holes in the cap pieces 12 of the two associated framing units, being hooked in place as shown in FIGS. 11 and 12 and spanning the distance between the two units with the mid portion of the rod depressed to provide a short horizontal run 19 which bears a pair of longitudinally spaced transverse bars 20 welded to it.

In the preferred commercial embodiment of the invention it has been found most practical to dispose the framing units 10 at ten foot spacings, so that the three such units shown set up FIG. 3 to form a framework that is twenty feet in length with each of the two rods 18 spanning a horizontal distance of ten feet and with a horizontal distance of five feet extending from the mid point of each horizontal run 19 to the plane of each framing unit 10.

The framework shown in FIG. 3, comprising the three framing units shown, is self sufficient and self sustaining, and it could be used as the entire framework of the whole battery. However, in actual practice it is desirable to build the battery in lengths considerably greater than the twenty feet shown in FIG. 3. The invention is admirably adapted to any desired length by the simple addition of further framing units 10, parallel to the three shown, and each spaced the same distance from the adjacent ones, and all connected together by rods 18 and also by troughs and cage assemblies which will now be described.

The purpose of the framework is to support the egg laying cage assemblies along with their appurtenant trough elements for supplying feed and water to the encaged hens and for collecting and removing the newly laid eggs.

To this end the basic framework is completed by the addition of feed trough means to the assembly of framing units heretofore described.

In the preferred embodiment of the invention the installation will include four tiers of cage assemblies, two at an upper level and two at a lower level, with the upper level tiers set closely back to back and the two at the lower level spaced outwardly therefrom so as to be forwardly wholly out beyond the plan projection of the upper tiers, as best appears in FIG. 2.

The cage assemblies are supported entirely by the framework, and very largely by stout lengths of troughing 21 which, as seen in FIG. 3, are mounted on the set up framing units 10 and extend along them in four lines, two on each side of the units, with the troughing on each side supported on the leg members 11 of the units and spaced vertically apart on the members sufficiently for the cage assemblies to fit behind the troughing in the described tiering arrangement, as shown in FIG. 2.

To this end and for this purpose each of the leg members 11 has a bracket 22, stamped from heavy sheet metal into the special shape best shown in FIG. 5, having appropriately shaped feet 27 bolted to the leg and rigidly outstanding from it and uniformly notched in its upper edge, preferably in the right-annular V-shape shown at 23, to form a horizontally aligned series of bearings for correspondingly channel shaped feed V-trough sections 24. These sections may be provided in appropriate lengths for overlapping at the brackets and are best made with the more or less right angularly bottom converging side walls and inwardly reversely bent front wall shown for receiving a conveyor chain whose links bear regularly spaced flights or scraper plates 25. Conventional dry feed in the troughs is propelled along the cage assemblies by movement of the chain in a well understood manner, and a front terminal hook 26 overlies the return bend in the front wall of the trough to secure it in position.

The troughing 21 is made of heavy sheet metal which, by reason of its generally channel shape, with its angled upper flange portions, constitutes a very rigid beam type element strong enough to support a very considerable weight. The troughing is used, in the present invention, to provide much of the support for the cage assemblies in a manner which will now be explained.

In the commercial embodiment selected to illustrate the invention, each of the cage assemblies is a section five feet long and is divided by transverse partitions into five individual cages each twelve inches wide, i.e., along the longitudinal dimension of the battery as seen in FIG. 1. The cages are made of heavy wire mesh formed into tops, backs, bottoms or floors, fronts and ends, with the partitions similarly formed, and with the bottoms or floors sloping downwardly and forwardly at an angle of some ten degrees to the horizontal. While dimensions and proportions form no part of the invention, broadly considered, we have found it practical for properly accommodating four hens in each cage to make the individual 12 inch wide cages 18 inches high at the front and 15 inches high at the back and 18 inches from front to rear. The mesh of the several panels, while not in all cases critical, is important in order to enable each of these parts to perform its intended functions efficiently and with certainty. Thus, we have found it eminently practical and satisfactory in the commercial embodiment of the invention to use mesh of the following dimensions:

Designating, for the purpose of the present description, the left to right dimension of each cage as the cage width, and the front to rear dimension as the cage length:

The mesh of each cage roof is two inches wide and four inches long.

The mesh of the floors, partitions and backs is one inch wide and two inches long.

The cage fronts are of special mesh relations and will be described in detail hereinafter.

So also the floors, where the wires that run the length of the cages, i.e., from rear to front, on one inch spacings, are continued out beyond the plane of the cage fronts.

We wish to emphasize again that these specifications, while generally speaking not critical, are very practical and are critical in respect of the floor because it has been found that interstices of slightly less than two inches in rear to front length and slightly less than one inch width provide adequate footing for the hens, give ample space for passing droppings and, of paramount importance in a laying battery, prevent retention of eggs. It has been found that freshly laid eggs will roll promptly by gravity toward the front of the floor, and that, while in some instances they may be delayed momentarily by nesting longitudinally in one of the oblong interstices, they will very soon be dislodged and continue their forward rolling by impingement of the feet of the hens.

To continue the description of the cage structure:

All of the rear to front wires forming part of the floor, designated 31, are extended out beyond the front wall of the cage and then bent down, forward and up as best shown in FIG. 7 to mesh with a few widely spaced longitudinal wires 32 and form a skeletonized trough 33. This is adapted to contain and support the upper run of an endless belt conveyor 35 which will be hereinafter described more in detail.

For the present discussion of the cage floors it is sufficient to state that the trough 33 is positioned directly in front of the front wall 38 of the cage assembly, with the down bend in the wires 31 positioned much closer to the plane of the front wall than the length of an average egg, and with the proximate longitudinal trough wire 32 depressed well below the sloping run of the cage floor. The result is that eggs are free to roll through the wide open space, two inches high, which is completely unobstructed all the distance across each cage front, between the floor and the lowermost horizontal wire 34 of the front (see FIGS. 7 and 8), out into the trough 33, and so that, if any egg should become somehow poised in the very small opening between two wires 31 just short of the trough depression, enough of the length of that egg will protrude back into the cage to be impinged very promptly by the toes of a hen in the cage. Thus such an egg is certain to be dislodged with little or no delay so that no opportunity is provided for the egg to suffer damage by the feet or beaks of the hens.

The cage front walls 38 are best shown in FIG. 8 and comprise simply stout vertical wires 39 two inches apart connected by the lowermost horizontal wire 34 (spaced two inches above the floor as heretofore explained) and by two additional horizontal wires, designated 40, spaced at four inch intervals. Thus the uppermost horizontal wire 40 is ten inches above the floor front, and the eight inch height of front wall above this horizontal wire is formed solely by the vertical wires 39. Thus each of the individual cages, which is twelve inches wide, has a front wall containing six two inch wide spaces between adjacent vertical wires. However, the upper halves of the two central wires, above the uppermost horizontal wire 40, are omitted, so that a six inch wide space is thus provided. This constitutes an opening 41 through which the hens may be put into and taken from the cage, and it is normally closed by the gate structure 42. As best shown by FIGS. 8 and 10, this gate structure comprises a mainly U-shaped bend of wire projecting up above the roof, through a narrow space between the horizontal wire at the top of the cage front and the foremost horizontal wire of the roof, having legs 43 aligned to substantially replace the two omitted wire lengths, and the lower ends of the legs are right angularly outwardly bent and provided with terminal eyes which slidably engage the two wires 39 defining the opening 41. Thus the gate 42 is slidable up and down on those two wires, in the narrow space referred to, to expose and close the opening 41, and the gate may be maintained normally latched in closed position by shoulders 45 formed in the upper portions of the legs which snap under adjacent horizontal wires of the cage roof when the gate is in fully lowered position, all as clearly shown in FIG. 8.

Each cage assembly constitutes a rigid five foot long unitary section which, according to an important feature of the invention, is adapted readily to be hung in operative position onto the framework shown in FIG. 3 and to be well supported thereby firmly and securely and with no danger of sagging or distortion even when the cages of all four tiers shown in FIG. 2 are mounted in place and when each of the cages is occupied by its full complement of four laying hens.

The mounting of the two sections of each of the two upper tiers, designated 50 in FIG. 2, is effected by supporting the adjoining ends of the sections on the intervening cap piece 12 in the manner shown in FIG. 12 where A represents the roof of one of the sections and B the roof of the abutting aligned section (see also FIG. 1). It will be noted that the section A has its roof hooked over the ears 14 of the cap piece, while the section B has its end edge resting on the cap piece. The fit is accomplished by providing the right hand end of each section with a transverse partition 51 and by leaving the left hand end of each section open and unprovided with a partition. Thus at the joint of the sections A and B in FIG. 12 the partition 51 which is part of section A serves to divide the abutted end cages of the two sections, with the framing leg 11 disposed wholly in the end cage of section B. This relationship of end abutted cages is repeated all along the line of assembled sections. Of course the left hand end of the section at the left end of the battery will have specially applied to it a special partition (not shown) closing it off.

With the abutted ends of adjacent sections A and B supported as stated, the other ends of the two five foot sections which meet at the center of the ten foot span between adjacent framing units 10 are supported in part by resting the bottoms or floors of the abutted endmost cages on the bars 20, which it will be noted are preformed at a slope corresponding to the floor slope.

The roofs of those abutted endmost cages may be coupled together by clips 52 as seen in FIG. 1.

The supported relation of what may be regarded as the inside ends of the two longitudinally aligned cage sections of one upper tier on the bars 20 is well shown in FIG. 4, and the manner in which the two back-juxtaposed sections of the two upper tiers equalize the weight borne by each of these bars, so that the welded connection of the bars to the wires or rods 18 is under no undue strain, is evident from FIG. 2.

With the upper tier cage section assemblies supported at their backs as just described, the fronts of the assemblies are coupled to the feed troughing 24 so as to be supported thereby in the manner best shown in FIGS. 4 and 7. As there depicted, a stout wire hanger 60 has its upper end bent and turned back into the cage front, to which it is unconnected, and extends vertically down behind the lower of the two cage front horizontal wires 40 to terminate immediately below that wire in a forwardly sloping and rearwardly hooked end 61 that is engaged over the inner flange lip of the feed troughing. The weight of the cage thus thrusts said wire 40 in wedging action down against the sloping surface 61 of the hanger 60 so that the cage is well supported by the troughing, and thus the series of hangers, disposed at frequent intervals along each cage section, serves to support the section rigidly on the troughing which, it will be recalled, is in turn supported on the framing units by the brackets 22.

The two end abutted five foot, five cage sections that span the ten foot distance between the center framing unit 10 and each next adjacent framing unit (and in each case between adjacent framing units 10 all along the battery line) thus constitute a veritable beam which stiffens the whole battery and is securely supported so as to be equal not only to supporting its own weight and the weight of the forty hens that normally occupy the ten cages of each two aligned sections, but also capable of affording a large measure of the support required by the lower tiers of cage sections, as will now be explained.

As will be evident from FIGS. 2 and 8 the complete installation includes two lower tiers of cage sections which are disposed outwardly beyond the plan projection of the upper tiers, with the rear walls of the lower tier cages in substantially the vertical plane of the front walls of the adjacent upper tier cages. The lower sections are similar in all respects to the upper sections, so that they may be fabricated by the same jigs, dies, etc. Their fronts are attached to the legs 11 of the framing members by the same kind of troughing brackets 22 and hangers 60, as will be observed in the lower portion of FIG. 4. The rear edges of the cage tops are hung from the floors of the superposed cages by wire hangers 64 that have their upper ends hooked to the upper cage floors in substantially the plane of the fronts of those cages and hang substantially vertically, with their lower ends hooked around the vortex of the lower cage tops and rear walls. These hangers 64 are positioned at close intervals along the battery, i.e., at junctures between adjacent cages, and provide adequate support for the lower tier cage backs. However, good additional support for the lower tier cage section rear zone is provided by the brackets 65 which, as shown in FIG. 4, are bolted around each of the leg members 11 and provide, on each opposite side of the leg, a depending flange terminating in a horizontal hook on which the roof or roof and partition of an endmost cage is hung.

Thus the lower tiers are well supported, front and back, and the assemblies thereof, being in all other respects the same as the assemblies of the upper tiers, function similarly as beam members bracing and stiffening the main framework of the battery.

Associated with the feed troughing along the front wall of each tier of cage assemblies are a superposed water trough and a subjacent egg collecting conveyor.

The water trough, designated generally 70, is conveniently formed of a series of V-shaped channel sections telescoped together at their ends and hung on the cage front walls by the means best shown in FIGS. 8 and 9. This consists of an adjusting plate 71 caught behind the two horizontal front wires 40 of the cages and provided with perforated outstanding ears 72 at its top and bottom. A rod 73 stands in the registering holes in the ears and has an upper saddle end in which the water trough is cradled. A nut 74 is welded to the plate 71 and a wing bolt or thumbscrew 75 stands through the nut to bear against the rod 73 so that its vertical position in the plate 71 can be adjusted. Sufficient of these supporting and adjusting devices are disposed along the cage fronts to provide good support for the trough sections and to enable them to be leveled accurately. A plastic sheet liner 76 renders the troughing 70 watertight. A troughing 70 may be extended along the entire front wall of each cage tier and may be continued right angularly around the ends of the tier, or around one of the ends, and there equipped with a float valve controlled supply pipe (not shown).

The egg collecting skeleton trough 33 has already been briefly described as being disposed in the front of each cage assembly slightly below the front edge of the cage floor and as being formed of the projecting floor transverse wires 31 meshed with longitudinal wires 32 and containing an endless belt conveyor 35. The belt 35 is preferably a preformed relatively flat V-shape of suitable flexible plastic with the two lateral halves of the V making a somewhat wider angle than the angle formed by the transverse wires of the trough. Hence the vertex of the belt is normally elevated slightly above the vertex of the wires of the trough, and an egg rolling out from a cage onto the belt is well cushioned by the give or yield of the belt center line. This shape has also the advantage of causing all the eggs promptly to become longitudinally aligned, as suggested by the position of the egg E in FIG. 7, so that objectionable rolling relative to the conveyor, when the conveyor is driven, is prevented.

The conveyor belt 35 will be driven from time to time by conventional roller drive mechanism (not shown) located out beyond one end of the battery, and the return run of the belt is supported close up beneath the trough 33 by a series of bearing brackets 80 shown best in FIGS. 5, 6 and 7. As there shown, each of these brackets is formed from a strip of light sheet metal bent into general U-shaped, with terminal ears that are bent securely around longitudinal wires 32 at the outer and inner edges of the skeletonized trough 33. If these brackets 80 are provided at the abutted ends of aligned cage sections, as is preferred and as is shown in FIG. 1, with each spanning the joint between sections and the ears of each being bent around the longitudinal wires 32 of the two sections, as shown in FIG. 6, the effect is to provide increased rigidity in the coupling of the two sections.

It has been found that confining these belt return brackets to spacings of five feet, as shown in FIG. 1, provides adequate support for the very light plastic belt.

Various details of the assembling of a plurality of framing units 10 and a multiplicity of cage sections, shown in the drawings which depict the preferred commercial embodiment of the invention, will, it is believed, be evident from those illustrations. It will be noted that conventional sheet metal clips 90 are used to fasten wire mesh wall, partition, floor and roof elements together. In FIG. 1 the showing of the feed trough sections 24, the water trough 70 and the egg conveyor trough as broken away at the ends of the figure is to indicate that these appurtenances of the battery are continued beyond the endmost cage sections.

As has been stated, one extreme end portion of the water trough is supplied by a float controlled valve. The projected end portion of the egg conveyor trough is provided with a suitable collecting bin, hopper or the like and appropriate drive mechanism, head and tail pulleys, etc. The feed troughing at each tier is best continued around the battery ends, so that a single conveyor chain in each trough will supply all the cages of the one tier, on both sides of the battery, front and back as seen in FIG. 2. A single overhead feed hopper, with a pair of delivery pipes or chutes, each directed to one of the two feed troughs, will supply both.

The detailed devices and mechanisms required for outfitting the battery with these appurtenances are well known and hence need not be specifically shown or further described herein.

It may be explained that a feature of considerable advantage of the invention is the excellent clearance provided beneath the vertically offset cages for the cleaning of droppings. The planks 16 define a wide space in which the droppings are confined. This space may be equipped with a scraper for removal, or it can be manually cleaned out from time to time as required.

It has in practice been found desirable to hang from the feed trough sections 24 a light plastic curtain 92 (FIG. 7) that will extend down substantially to the surface of the protruding portion of the cage floors for the purpose of protecting the conveyor belt 35 from being soiled by feed particles, droppings, feathers and the like. This curtain offers no appreciable resistance to the rolling of the eggs; however to eliminate substantially all resistance it may be slitted vertically crosswise at frequent intervals if desired.

It may be stated, in conclusion of the foregoing brief explanation of the preferred embodiment of the invention shown in the drawings, that numerous changes in details and alterations of the precise forms here shown and described are contemplated within the broad spirit of the inventive principles, as will be understood by those skilled in the art, and that all such modifications, to the extent that they embody the principles of the invention as defined by the appended claims, are to be deemed within the scope and purview thereof.

Moreover, it is to be recognized that the drawings of necessity are in some respects and details inadequate to depict the invention to best advantage. Thus, for example, whereas the individual cages of each section are shown and have been described as though made up in each instance of an assembly of separate front, back, top, floor and partition panels, the preferred arrangement is to combine adjacent panels from integral lengths of wire stock. Thus the horizontal wires of adjoining fronts may be continuous throughout the section; the vertical wires of a cage front and the front to rear wires of the top of that cage may be continuous; and these same wires may be continued down in the back of the cage to form the vertical wires thereof. Similarly, single longitudinal wires may extend across all the floors of the cages of a section, and other single longitudinal wires across all the roofs of the cages of a section. The drawings, therefore, should be viewed with the foregoing and analogous considerations of details in mind.

We claim:
1. In a cage battery for laying hens, a plurality of upright frames, each comprising a pair of downwardly and outwardly sloping members defining a substantially inverted V-shaped unit, disposed in longitudinally spaced parallelism,
   a bracket outstanding from each of said sloping members at a given level intermediate the height of the members,
   an elongated generally channel shaped trough disposed in said brackets,
   and a plurality of cages arranged side by side in a longitudinal series between said frame units, being hooked to said troughs and supported thereby.

2. The cage battery claimed in claim 1 in which said brackets, troughs and plurality of cages are provided on both the front and rear sloping members of each of the frame units.

3. The cage battery claimed in claim 1 in which said brackets, troughs and plurality of cages are provided at two levels on both the front and rear sloping members of each of the frame units.

4. The cage battery claimed in claim 1 in which the cage floors are formed of wire mesh and certain of the wires forming said mesh project forwardly from the front walls of the cages in the form of V-shaped extensions providing a skeletonized trough,
  an endless belt is disposed in said trough for receiving eggs rolled from said floors,
  and brackets are secured to the cages and project below said trough for supporting the return run of said belt.

5. The cage battery claimed in claim 4, in which said last named brackets are secured to the wires of adjacent cages on opposite sides of one of said sloping members and serve also to secure said adjacent cages together.

6. In an egg laying cage construction, a pair of frames, arranged in laterally spaced parallel vertical planes, each comprising a pair of downwardly diverging leg members,
  a cage section extending between corresponding leg members of said frames and being secured thereto,
  said cage section having top, bottom and front and rear walls, vertical end walls and vertical partitions between said end walls to form individual cages, all of said walls being formed of wire mesh,
  a feed trough extending between said corresponding leg members of said frames forwardly of said front wall and extending longitudinally of said cage section,
  means supporting said feed trough on said leg members,
  said bottom wall being formed of longitudinal and transverse wires, the latter of which slope downwardly toward and beyond said front wall and terminate forwardly thereof in laterally aligned V-shaped extensions to form a skeletonized trough adapted to support a conveyor belt for the removal of eggs which roll from the individual cages, and
  means for supporting said cage section relative to said frames and said feed trough.

7. A construction according to claim 6 provided with brackets carried by said leg members and fixed to said trough,
  said front wall comprising horizontal longitudinal wires the lowermost of which is spaced above said bottom wall for the passage of eggs beneath said lowermost wire, and
  means connected to said trough and passing beneath one of said horizontal wires of said front wall above said lowermost wire to support said section at said front wall,
  said trough adjacent said front wall having a flange extending inwardly of said trough away from said front wall, and
  wires spaced along said trough hooked beneath said flange and extending beneath and engaging a horizontal wire of said front wall beneath said lowermost wire to support said cage section at said front wall.

8. In an egg laying cage construction, a framework comprising a pair of frames of inverted V-shaped arranged in longitudinally spaced parallel planes,
  a cage section at each side of said framework near the top thereof,
  each section having top, bottom, front and rear walls, vertical end walls and vertical partition walls spaced apart to form individual cages, all of said walls being formed of wire mesh,
  means for supporting said sections with respect to said framework including a rod fixed at each end to the top of a frame and sloping downwardly therefrom, the center of such rod being horizontal and having transverse bars fixed to such horizontal portion and engaging beneath the bottom walls of said sections,
  said bottom wall of each cage sloping downwardly toward the front wall thereof,
  and the wires of said bottom wall including horizontal and transverse wires, the latter of which project forwardly beyond the associated front wall and terminate in laterally aligned V-shaped extensions cooperating to form a skeletonized horizontal trough adapted to support a conveyor belt for removal of eggs rolling from said cages.

9. A construction according to claim 8 provided with a feed trough extending horizontally adjacent the front wall of each section,
  and brackets carried by the framework and engaging and supporting said feed troughs,
  said means for supporting said sections including devices connecting said feed troughs to the adjacent front walls of said cages.

10. In an egg laying cage construction, a pair of spaced supporting frames,
  a cage section extending between said frames,
  said section having top, bottom, front and rear walls, vertical end walls, and partition walls spaced apart between said end walls to form individual cages, all of said walls being formed of wire mesh,
  the front wall of said section being made up partly by vertical wires and partly by gates arranged between certain of said vertical wires, each gate being at the front of an individual cage and comprising an inverted U-shaped resilient member looped at its top and having depending arms the lower ends of which extend oppositely outwardly horizontally and terminate in loops slidably surrounding the adjacent vertical wires of said front wall,
  the upper ends of the arms of each gate being shouldered for snap engagement beneath a wire of said top wall to latch the gate in closed position, the inward swinging of the lower ends of the arms of each gate toward each other releasing the gate for upward movement to provide an opening through which hens may be inserted and removed,
  said bottom wall being common to all of said individual cages and including transverse wires sloping downwardly toward the front of said section for the rolling of eggs thereover from each cage, said transverse sloping wires extending beyond said front wall and terminating in aligned V-shaped portions cooperating to form a skeletonized horizontal trough adapted to support a V-belt conveyor for the removal of eggs discharged from said individual cages.

11. A construction according to claim 10 wherein one of the wires of said front wall is at the top thereof and extends horizontally throughout the length of such wall,
  and a second wire is disposed rearwardly of said top wire in the plane of said top wall and forms with said first wire a narrow space for accommodating the vertical silding movement of each of said gates.

12. A laying cage battery comprising longitudinally spaced apart frame elements each of inverted V-shape and including diverging leg members,
  brackets outstanding from said leg members in horizontal alignment,
  troughing supported on said brackets and connecting said frame elements to form a skeleton framework,
  a cage section disposed between each adjacent pair of said frame elements with its ends abutted against said pair of elements, connected thereto, and acting in the manner of a beam to rigidify said framework,
  means connecting the front of each section with said troughing, means partitioning each section into a plurality of individual cages, means mounting a watering trough and a feeding trough on the front of said section, and means supporting a conveyor on the front of each section below the level of the bottom thereof for receiving eggs therefrom.

13. A laying cage battery as claimed in claim 12, including a pair of cage sections disposed back to back at a common level on said framework, one connected to and between the parallel leg members at the front of the framework, and the other connected to and between the parallel leg members at the back of the framework.

14. A laying cage battery as claimed in claim 13, including a second cage section connected to and between the front leg members below the level of and outwardly beyond the plan projection of the first named cage section of said front leg members, and a second cage section connected to and between the rear leg members below the level of and outwardly beyond the plan projection of the first named cage section of said rear leg members, each of said cage sections having a floor formed of wire mesh for passing droppings.

References Cited by the Examiner

UNITED STATES PATENTS

| | | | |
|---|---|---|---|
| 2,612,862 | 10/1952 | Ipsen | 119—18 |
| 2,806,446 | 9/1957 | Hendryx | 119—17 |
| 2,851,990 | 9/1958 | Rowland | 119—18 |
| 2,882,857 | 4/1959 | Ernst et al. | 119—18 |
| 2,956,667 | 10/1960 | Coulliette et al. | 119—18 X |
| 3,119,375 | 1/1964 | Ernst | 119—48 |
| 3,180,314 | 4/1965 | Van Huis et al. | 119—48 |
| 3,192,901 | 7/1965 | Wolff | 119—17 |
| 3,208,430 | 9/1965 | Ernst | 119—18 |

SAMUEL KOREN, *Primary Examiner.*

ALDRICH F. MEDBERY, *Examiner.*